US011978002B2

(12) United States Patent
Clements (10) Patent No.: US 11,978,002 B2
(45) Date of Patent: May 7, 2024

(54) COMPUTER ENHANCEMENTS FOR INCREASING SERVICE GROWTH SPEED

(71) Applicant: Douglas Logan Darrow Clements, Morristown, NY (US)

(72) Inventor: Douglas Logan Darrow Clements, Morristown, NY (US)

(73) Assignee: Douglas Logan Darrow Clements, Winnetka, CA (US)

( * ) Notice: Subject to any disclaimer, the term of this patent is extended or adjusted under 35 U.S.C. 154(b) by 263 days.

(21) Appl. No.: 16/673,698

(22) Filed: Nov. 4, 2019

(65) Prior Publication Data
US 2020/0160241 A1     May 21, 2020

Related U.S. Application Data

(63) Continuation-in-part of application No. 16/181,018, filed on Nov. 5, 2018, now Pat. No. 10,528,964.

(51) Int. Cl.
G06Q 10/0637     (2023.01)
G06Q 30/0207     (2023.01)
G06Q 30/0214     (2023.01)

(52) U.S. Cl.
CPC ..... *G06Q 10/0637* (2013.01); *G06Q 30/0214* (2013.01); *G06Q 30/0236* (2013.01)

(58) Field of Classification Search
USPC ............................. 705/14.39, 26.1, 14.16
See application file for complete search history.

(56) References Cited

U.S. PATENT DOCUMENTS 6,345,261 B1 *   2/2002   Feidelson .......... G06Q 30/0236
                                                           705/14.18
10,528,964 B1    1/2020   Clements
(Continued)

FOREIGN PATENT DOCUMENTS

CN     113302896 A     8/2021
CN     116866345 A     10/2023
(Continued)

OTHER PUBLICATIONS

Burke, Moira, et al. "Feed Me: Motivating Newcomer Contribution in Social Network Sites." CHI 2009—Social Networking Sites, Apr. 7, 2009. (Year: 2009).*

(Continued)

*Primary Examiner* — Tarek Elchanti
(74) *Attorney, Agent, or Firm* — Schwegman Lundberg & Woessner, P.A.

(57) ABSTRACT

Techniques to increase a speed of a growth of a service are disclosed. User-specific information is dynamically calculated for each of a plurality of users of the service while each of the plurality of users is accessing the service. The user-specific information includes scores associated with the plurality of users. The scores represent combined values of points associated with each of a set of scoring activities performed by each of the plurality of users with respect to the service. Designated users are identified from the plurality of users based on a determination that one or more qualifying criteria have been satisfied. A transferring of a value to each of the one or more identified designated users is initiated based on a determination that one or more granting criteria have been satisfied.

22 Claims, 6 Drawing Sheets

(56) References Cited

U.S. PATENT DOCUMENTS

| | | | |
|---|---|---|---|
| 2011/0320250 A1 | 12/2011 | Gemmell et al. | |
| 2012/0253918 A1* | 10/2012 | Marois | G06Q 30/02 705/14.39 |
| 2013/0080549 A1 | 3/2013 | Watanabe et al. | |
| 2013/0132220 A1* | 5/2013 | Baum | G06Q 30/02 705/26.1 |
| 2014/0164087 A1* | 6/2014 | Sun | G06Q 30/0224 705/14.25 |
| 2017/0330220 A1* | 11/2017 | Korada | G06F 16/9535 |

FOREIGN PATENT DOCUMENTS

| | | |
|---|---|---|
| JP | 2001092887 A | 4/2001 |
| JP | 2006163755 A | 6/2006 |
| JP | 2008077521 A | 4/2008 |
| JP | 2012242976 A | 12/2012 |
| WO | WO-2016006083 A1 | 1/2016 |
| WO | WO-2018025384 A1 | 2/2018 |
| WO | WO-2020096991 A1 | 5/2020 |

OTHER PUBLICATIONS pbismissouri.org, offering the first value transfer to users of the plurality of users that belong to the first motivation. ter group and offering the any additional value transfers to users of the plurality of users that belong to the any additional motivation tier groups, 2018 (Year: 2018).*
"Canadian Application Serial No. 3,118,870, Response filed Oct. 15, 2021 to Office Action dated Jun. 17, 2021", 22 pgs.
"European Application Serial No. 19882122.5, Extended European Search Report dated Dec. 17, 2021", 9 pgs.
"Japanese Application Serial No. 2021-523995, Notification of Reasons for Refusal dated Oct. 5, 2021", with machine translation, 5 pgs.
"Japanese Application Serial No. 2021-523995, Response filed Dec. 24, 2021 to Notification of Reasons for Refusal dated Oct. 5, 2021", with English translation of claims, 11 pgs.
"U.S. Appl. No. 16/181,018 Response filed Jul. 11, 2019 to Non-Final Office Action-Prioritized Exam dated Apr. 12, 2019", 26 pgs.
"U.S. Appl. No. 16/181,018, Examiner Interview Summary dated Jul. 8, 2019", 4 pgs.
"U.S. Appl. No. 16/181,018, Non Final Office Action dated Apr. 12, 2019", 16 pgs.
"U.S. Appl. No. 16/181,018, Notice of Allowance dated Oct. 7, 2019", 14 pgs.
"Which are the Top 5 Altcoins for Incentives—Rewards—Gamification?", [Online] Retrieved from the internet: <https://www.kryptographe.com/top-5-altcoins-incetives-rewards-gamificalion>, (Nov. 6, 2018), 13 pgs.
Aaron, Ordendorff, "Loyalty Program Examples: 25 Strategies & 100+ Stats from Ecommerce & Retail", [Online] Retrieved from the internet: <https//www.shopify.com/enterprise/loyalty-programs>, (Aug. 16, 2018), 45 pgs.
Sophia, Bemazzani, "Customer Loyalty: The Ultimate Guide", [Online] Retrieved from the internet: <https://blog.bubspot.com/service/customer-loyalty>, (Nov. 6, 2018), 24 pgs.

Thorin, Klosowski, "A Beginner's Guide to Airline Miles", [Online] Retrieved from the internet: <https://lifehacker.com/a-beginners-guide-to-airline-miles-1592887319>, (Jun. 19, 2014), 12 pgs.
"International Application Serial No. PCT/US2019/059723, International Search Report dated Dec. 13, 2019", 2 pgs.
"International Application Serial No. PCT/US2019/059723, Written Opinion dated Dec. 13, 2019", 3 pgs.
"Canadian Application Serial No. 3,118,870, Office Action dated Jun. 17, 2021", 6 pgs.
"International Application Serial No. PCT/US2019/059723, International Preliminary Report on Patentability dated May 20, 2021", 5 pgs.
"Mexican Application Serial No. MX/a/2021/005235, Office Action dated Jun. 23, 2021", machine translation, 7 pgs.
"Mexican Application Serial No. MX/a/2021/005235, Response filed Aug. 18, 2021 to Office Action dated Jun. 23, 2021", with machine translation, 8 pgs.
"Australian Application Serial No. 2019375417, First Examination Report dated Mar. 24, 2022", 4 pgs.
"Canadian Application Serial No. 3,118,870, Non Final Office Action dated Jun. 20, 2022", 5 pgs.
"Chinese Application Serial No. 201980072640.4, Decision of Rejection dated Jun. 28, 2022", w/ English Translation, 7 pgs.
"Chinese Application Serial No. 201980072640.4, Office Action dated Jan. 4, 2022", w/English Translation, 9 pgs.
"Chinese Application Serial No. 201980072640.4, Response filed May 19, 2022 to Office Action dated Jan. 4, 2022", with machine translation, 12 pgs.
"European Application Serial No. 19882122.5, Response filed Jul. 21, 2022 to Extended European Search Report dated Dec. 17, 2021", 109 pgs.
"Japanese Application Serial No. 2021-523995, Notification of Reasons for Refusal dated Mar. 8, 2022", w/ English Translation, 4 pgs.
"Japanese Application Serial No. 2021-523995, Response filed May 30, 2022 to Office Action dated Mar. 8, 2022", with English translation of claims, 13 pgs.
"Australian Application Serial No. 2019375417, Response filed Oct. 3, 2022 to First Examination Report dated Mar. 24, 2022", 24 pgs.
"Australian Application Serial No. 2019375417, Subsequent Examiners Report dated Oct. 27, 2022", 5 pgs.
"Canadian Application Serial No. 3,118,870, Response filed Oct. 6, 2022 to Non Final Office Action dated Jun. 20, 2022", 45 pgs.
"Chinese Application Serial No. 201980072640.4, Notice of Reexamination dated Apr. 26, 2023", w/ English Translation, 7 pgs.
"Japanese Application Serial No. 2022-112207, Notification of Reasons for Rejection dated Aug. 1, 2023", w/ Machine Translation, 7 pgs.
"Japanese Application Serial No. 2022-112207, Response filed Dec. 28, 2023 to Notification of Reasons for Rejection mailed Aug. 1, 2023", English Claims, 15 pgs.
"Japanese Application Serial No. 2022-112207, Final Notification of Reasons for Rejection mailed Jan. 30, 2024", w English Translation, 6 pgs.
"Credit card and point win combination", Tokuma Shoten Co., Ltd, with machine translation (Jan. 1, 2018), 8 pgs.
"Canadian Application Serial No. 3,118,870, Non-Final Office Action mailed Feb. 23, 2024", 6 pgs.

* cited by examiner

COMPUTER ENHANCEMENTS FOR INCREASING SERVICE GROWTH SPEED

CROSS-REFERENCE TO RELATED APPLICATIONS

This application is a continuation-in-part of and claims the benefit of U.S. patent application Ser. No. 16/181,018, filed Nov. 5, 2018, which is incorporated by reference herein in its entirety.

TECHNICAL FIELD

The present disclosure relates to the field of tools for improving services and, in one specific example, to computer enhancements for increasing a speed of a growth of an online service.

BACKGROUND

A large number of services are available to users on the Internet, including social media platforms, e-commerce sites, news and commentary services, online gaming platforms, and others. Also, many services that exist primarily separately from the Internet, such as so-called brick-and-mortar businesses, have established a presence on the Internet to sell goods and services online, advertise their goods and services, and otherwise connect with existing and potential customers. In both examples, attracting new users to register with or otherwise use a service can be crucial to the success of the service. Moreover, the value of various types of services may be determined, at least in part, by a network effect whereby the value of the service increases (e.g., linearly or in some instances exponentially) as the service attracts and maintains a larger user population. Accordingly, services seek new ways to build their user base and thus survive and grow.

DETAILED DESCRIPTION

Implementations of the present disclosure are generally directed to tracking and rewarding users of a service, such as an online, Internet-based, computer-implemented service. More particularly, implementations of the present disclosure are directed to monitoring the number of users who have registered with a service, determining which of the users are designated users based on various criteria, determining if the number of designated users reaches a predetermined threshold (e.g., before a predetermined deadline time/date), and transferring value such as a grant of shares to each of the designated users.

In general, implementations of innovative aspects of the subject matter described in this specification can be embodied in a method that includes the following operations: accessing registration data that identifies registered users of a service; analyzing the registration data to determine a number of designated users of the service, wherein a user is determined to be a designated user based at least partly on the user having registered with the service no later than a time when a number of designated users of the service reaches a predetermined target parameter; and based at least partly on the number of designated users being at least the target parameter, sending a network communication to initiate, to each of the designated users, a transfer of a value that includes at least a portion of a share in an entity that is associated with the service.

Implementations of innovative aspects of the subject matter described in this specification can be embodied in a method that includes the following operations: accessing registration data that identifies registered users of a service; analyzing the registration data to determine a number of designated users of the service, wherein a user is determined to be a designated user based at least partly on the user having registered with the service prior to a predetermined deadline; and sending a network communication to initiate, to each of the designated users, a transfer of a value that includes at least a portion of a share in an entity.

These and other implementations can each optionally include one or more of the following innovative aspects: the user is determined to be a designated user further based on the user having registered with the service prior to a predetermined deadline; the grant is transferred to each of the designated users based on a determination that the service reached the target parameter of designated users no later than the deadline; the operations further include presenting, in a user interface (UI) of the service, the deadline; the user is determined to be a designated user further based on a user score for the user being at least a threshold score, the user score calculated based on detecting one or more activities performed by the user through the service; the one or more activities include one or more of uploading content to the service, creating content on the service, sending at least one message through the service, initiating at least one transaction through the service, interacting with at least one advertisement through the service, inviting at least one other user to register with the service, inviting at least one other user to register for the service who registers and becomes another designated user, communicating with at least one other user through the service, subscribing to the service, interacting with at least one other user through the service, and using the service for at least one activity; at least two of the activities are weighted differently in calculating the user score; an amount of shares included in the grant to a designated user is based on the user score for the designated user; the operations further include presenting, in a UI of the service, a current user score for one or more of the designated users; the user score is calculated further based on detecting one or more other activities performed by the user through at least one other service; the user is determined to be a designated user further based on the user being in a top-ranked predetermined number of users ranked according to the user score; the operations further include presenting, in a user interface (UI) of the service, a current number of designated users of the service; and/or the entity associated with the service.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

Implementations of the present disclosure are directed to techniques for tracking users of a service, identifying designated users based on various criteria, and transferring value to each of the designated users based on the evaluation of certain parameters, such as whether the number of designated users reaches a predetermined threshold number, and/or whether the number of designated users reaches the predetermined threshold number no later than a predetermined deadline (e.g., date and/or time).

Implementations provide a platform and/or mechanism to incentivize users to register with and/or actively participate in a service, such as an online service that is provided through the Internet, by providing designated users with some value if a certain predetermined threshold number of users become registered with the service and/or if other criteria are satisfied. In some implementations, the value transferred is a grant of an amount of shares of stock in an entity (e.g., a corporation) that operates or is otherwise associated with the service being offered. For example, the first million users to register as members of a newly launched social network site can be awarded with a grant of a certain number of shares of stock in the entity that owns or operates the social network site, if a threshold number of registered users (e.g., one million) is reached prior to a predetermined threshold deadline (e.g., date and/or time). In some examples, designated users can also be identified based on their activities through the service, particularly activities that contribute value to the service in some (e.g., quantifiable) way. For example, designated users can be determined based on those users who post content to a site (e.g., comments, blog posts, product reviews, media content, etc.), purchase products through the site, click on advertisements on the site, invite other users to join the site, and so forth. In some implementations, a user score can be calculated for a registered user based on their various activities, and users with a score that exceeds a threshold score may be designated as designated users to receive the shares grant or other value.

Accordingly, implementations provide a data-processing platform that operates to identify designated users based on various factors, such as whether the users registered with the service prior to the time when a threshold number of designated users (referred to herein as the stocking number), and/or prior to the expiration of a predetermined deadline (referred to herein as the stocking deadline). Designated users can be eligible to receive the transferred value (e.g., shares grant). In some examples, the value is transferred to the designated users if the stocking number of designated users is reached before the stocking deadline expires. Moreover, in some implementations, users are identified as designated users because they engaged in desirable value-adding activities through the service, such as the uploading of content, inviting or referring new users to register, purchasing products, viewing advertisements, sending messages through the service, and/or other activities that may contribute to the overall value of the service. Such activities may be detected, e.g., prior to the expiration of the stocking deadline, and used to calculate a score for each user. Users whose scores exceed a predetermined threshold can be identified as designated users. In this way, implementations provide a mechanism by which valuable, desirable users are more incentivized to register and actively engage with the service, and users that do register are incentivized to engage in highly desirable activities.

Implementations support the use of any suitable type of value that may be transferred to designated users to incentivize their registration with the service and/or incentivize the users to perform the value-adding (e.g., desirable) activities through the service and/or elsewhere. In some implementations, the value is a grant of one or more shares (e.g., stock shares), or at least a portion of at least one share, in an entity that owns or is otherwise associated with the service. For example, an increased user count and/or increase in the number of particularly value-adding users may serve to increase the value of the service and of the entity that operates the service. Accordingly, a grant of shares to the users enables participating users to directly benefit from the increased value of the service, which the users themselves contributed to. Providing the transfer of value to designated users enables a service to achieve a desired network effect by rapidly growing their number of users and/or incentivizing the participation of value-adding users.

In some implementations, users are vetted during the registration process to ensure that the registered users of the service satisfy various criteria. Such criteria may include, but are not limited to, allowing the registration of users who are: at least a minimum age (e.g., 18 years old), reside in one of a particular set of designated areas (e.g., countries, states, cities, provinces, prefectures, etc.), a citizen of one of a particular set of designated countries. Registration may also be limited to users who can produce a verifiable credential, such as an image of a valid, non-expired, government-issued identification credential (e.g., passport, driver license, etc.). The registration process may also employ any suitable technique to ensure a single registration per user and to ensure that users are actual humans and not automated processes (e.g., bots), to prevent fraud and abuse.

From among a population of registered users of a service, designated users can be identified based on one or more of the following criteria:

The user having registered with the service prior to the service registering the predetermined stocking number of users (e.g., one million).

The user having registered with the service prior to the expiration of the predetermined stocking deadline. The stocking deadline can be a particular date, a particular time, or a particular time on a particular date, with date and time described using any suitable format. Expiration of a deadline, as described herein, indicates that the date and/or time has passed beyond the date and/or time designated as the deadline.

The user having a user score that is at least a predetermined threshold score. The user score for a user can be calculated based on the detection of designated (e.g., value-adding) activities that the user engages in through the service. Such activities can include, but are not limited to, one or more of the following: adding content to the service, such as uploading images, video, audio, graphics, and/or other media content, posting comments, posting reviews, posting articles, and so forth; inviting, referring, or otherwise contributing to other users registering for the service; creating such content on the service, such as composing a review, blog post, and/or other content within the service; viewing advertisements and/or other designated content through the service; initiating at least one transaction through the service, such as buying product(s) or service(s) offered for sale through the service, and/or selling (or offering to sell) product(s) or service(s) through the service; and/or sending messages through the service. The activities can also include another other type of activity that is performed by the user through the service. For example, the activities can include a user initiating a subscription to the service, such as a subscription that charges a periodic (e.g., monthly) fee.

In some examples, the score can be calculated based on the activities that the user performed prior to the expiration of the stocking deadline. In some implementations, the user score can also be based on activities performed by the user through other services (e.g., using other web sites, apps, and so forth) that are designated for tracking user activity using pixels, beacons, cookies, or other suitable techniques. In some implementations, different activities are weighted differently (e.g., awarded different point values) in calculating the score for a user. For example, the referral of other users to the service may be weighted more heavily in the calculation than the viewing of an advertisement or commenting on a blog post. As another example, posting a link to a video might be allocated more weight than posting a link to an article, and attracting a new designated user might be allocated more weight than posting a video. The service may inform the users of the weights allocated for various activities, to incentivize the more value-adding activities more heavily. The service may also notify users of their current scores and the scores they would need to achieve to become designated users prior to the expiration of the stocking deadline. Such notifications can be made to users through a user interface (UI) of the service, a message sent to the service to the users, and/or other suitable mechanisms.

In some examples, a higher score may be granted for a referral that leads to a successful registration of a designated user and even higher score for a referral that leads to the successful registration of a highly-desirable user (e.g., contributing more than a threshold number of activities). Such rule(s) may be applied to avoid and/or not incentivize referrals that do not lead to value being added to the service, and/or referrals that result is inactive or dormant user registrations. For example, a user may be given points toward their score based on one or more of the following considerations:

If the referrals register. For example, no points may be given just for referring, unless the referrals register.

If the referrals become designated users and not just registered users.

If the referrals become designated users based on exceeding a fixed score.

If the referrals become designated users based on a dynamic (rising) score with a "top one million users on the leader board". This may be applied given that some users may go in and out of this top group until the deadline is reached.

For users who refer others called referring user, and users who are referred called referred users, a referring user may not receive points if their referred user is a bot, a fraudster, opens multiple accounts, and/or otherwise engages in suspicious behavior. In some instances, if referring users are bots/fraudsters/multiple account holders but their referred users are legitimate, the referring users may be disqualified but the referred users may be allowed to participate and attempt to become designated users.

In some implementations, designated users are identified as those users who are ranked in the top N users according to the user scores. For example, the top one million users ranked according to score may be designated as designated users to receive the value transfer. In such instances, implementations may calculate, e.g., dynamically and/or in real time, the scores of the users, which are updated based on the latest activities of the users. The users may be periodically notified of their ranking and/or whether they are designated users or not, to incentivize the users to continue engaging in the scored activities and/or increase their activities to achieve and maintain a ranking to be a designated user.

When a new service is started it may be difficult for the service to acquire a large number of users and/or to acquire a large number of desirable, value-adding users. Traditionally, services have used previously available techniques such as free trials, discount prices, and expensive advertising. However, on the Internet where many services are already offered for free (e.g., social media, news media, video hosting, email, etc.), these traditional techniques may not be effective. Moreover, in some instances it may be difficult for a new service to acquire users while trying to compete with a preexisting, established service that is already serving these users. Implementations described herein provide a mechanism to incentivize users to register for a service, by providing value such as an ownership and/or equity stake in the entity that operates the service.

In example embodiments, techniques to increase a speed of a growth of a service are disclosed. User-specific information is dynamically calculated for each of a plurality of users of the service while each of the plurality of users is accessing the service. The user-specific information includes scores associated with the plurality of users. The scores represent combined values of points associated with each of a set of scoring activities performed by each of the plurality of users with respect to the service. Designated users are identified from the plurality of users based on a determination that one or more qualifying criteria have been satisfied. The one or more qualifying criteria include that each of the designated users has a ranking that transgresses a threshold ranking, the ranking being based on the scores. A transferring of a value of the service to each of the one or more identified designated users is initiated based on a determination that one or more granting criteria have been satisfied, the granting criteria including that a stocking number of designated users have been reached prior to expiration of a stocking deadline.

Techniques are described for tracking users of a service, and identifying designated users based on various criteria. Criteria for identifying designated users can include whether the users registered for the service prior to a deadline, and/or whether the users are among the first predetermined number of users to register. Designated users can also be identified based on activities performed by users through the service. Value, such as at least a portion of a share in an entity associated with the service, can be transferred to each of the designated users (e.g., through a network transfer) based on the evaluation of parameters such as whether the number of designated users reaches a predetermined threshold number, and/or whether the number of designated users reaches the predetermined threshold number no later than a predetermined deadline.

Figure 1:
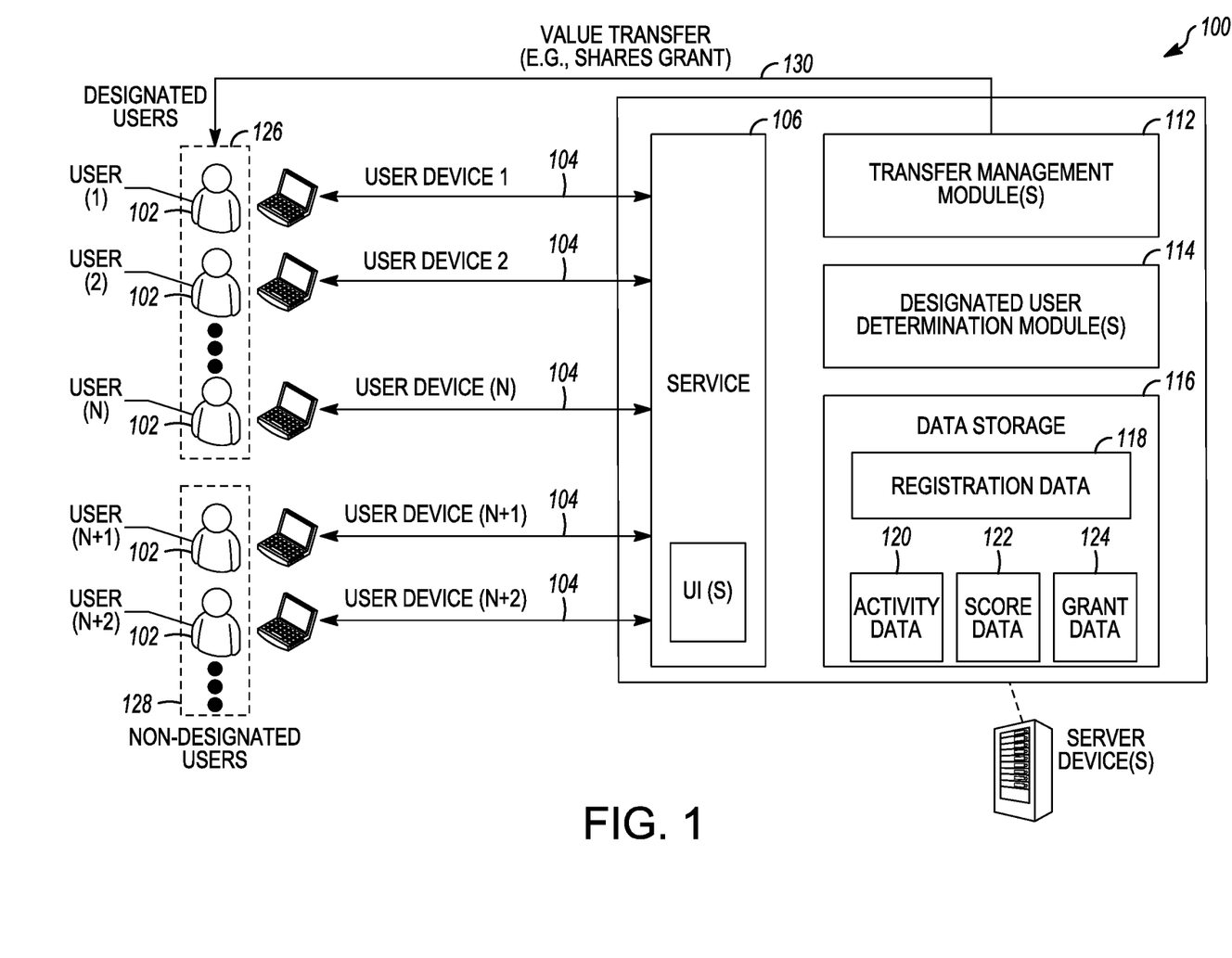
FIG. 1 depicts an example environment, according to implementations of the present disclosure.

FIG. 1 depicts an example environment 100, according to implementations of the present disclosure. As shown in this example, the environment 100 can include one or more user devices 104 each operated by or otherwise associated with a user 102. A user device 104 can include any suitable type of computing device, including portable computing devices (e.g., smartphones, tablet computers, wearable computers, etc.) as well as less portable types of computing devices (e.g., desktop computers, laptop computers, smart appliances, gaming or entertainment consoles, etc.). The environment 100 can also include one or more server devices 108 that host and/or operate a service 106. The server device(s) 108 can include any suitable number and type of computing device, and can include distributed computing (e.g., cloud computing) server(s). The user device(s) 104 can communicate with the service 106 over one or more networks such as the Internet.

The service 106 can be any suitable type of service 106, including but not limited to an e-commerce site, a social network platform, a gaming platform, a news and/or commentary site, and so forth. The service 106 may be implemented using any suitable technology. For example, the service 106 can be a web site that is served by web servers, with content provided by application servers accessing persistence layer databases, middleware software, and/or other components. Such a web site can include any number of pages that are presented through a web browser and/or other suitable container for web content executing on the user device(s) 104. In some implementations, the service can be provided through some other type of application executing on the user device(s) 104, such as a native application or app. In some examples, the information presented through the application can be communicated to the user device(s) 104 from the service 106. The service 106 can include any suitable number and type of UI(s) 110 that present information to the user(s) 102.

The server device(s) 108 can also execute one or more transfer management module(s) 112, and/or one or more designated user determination module(s) 114. The server device(s) 108 can also include data storage 116. The module(s) 112, module(s) 114, and data storage 116 can collectively be described as the platform. The platform may interact with the service 106 to: 1) identify designated users of the service, 2) identify conditions in which the value transfer is to be made (e.g., satisfying the stocking number of designated users prior to expiration of a stocking deadline), and 3) initiate the transfer of the value to the designated users at the appropriate time (e.g., upon expiration of the stocking deadline or at some other date/time), such as initiating a transfer of a grant of a certain number of shares to each designated user.

The data storage 116 can store registration data 118 identifying registered users of the service 106, activity data 120 describing the activities (e.g., value-adding, desirable activities) of the users detected on the service 106, score data 122 describing (e.g., current) user scores for one or more users, and/or grant data 124 describing the value to be transferred (and/or that has been transferred) to the designated users. The data storage 116 can be part of the platform, hosted on the same server device(s) 108 as the module(s) 112 and/or 114, or can be external and hosted on other device(s) that are accessible over one or more networks. Although the platform is shown as in this example as being hosted on the same server device(s) 108 as the service 106, implementations are not so limited. In some implementations, the platform can be hosted separately from the service 106, on other device(s). In such examples, the platform can receive from the service 106, over one or more networks, information regarding registrations, activities, and/or other information regarding users of the service 106.

The module(s) 114 may analyze the registration data 118, the activity data 120, and/or other information to identify designated users 126 and/or non-designated users 128 as described herein. The module(s) 112 may initiate and/or otherwise manage the value transfer 130 to the designated users, such as the initiation of the shares grant to the designated users.

The value transferred to designated users can be of any suitable value, and may be determined to provide adequate incentive for user registration and/or activities on the service 106. For example, an entity that operates a service 106 may offer a substantial portion of its outstanding stock (e.g., 49%) as part of this program, with this amount divided among the identified designated users.

A designated user may be designated as a user who has satisfied all the qualifying criteria. In some implementations, the criteria include registering as one of the first N users (e.g., the stocking number) who register with the service. The criteria may also include registering before the expiration of the stocking deadline. The criteria may also include satisfying a minimum user score that is calculated based on the user's activities on the service and/or other service(s). In some examples, the criteria include being in the top M users ranked according to their user scores, to further incentivize users to add value to the service by engaging in valued-adding, scored activities.

If certain granting criteria are satisfying, each designated user can receive the transfer of value. Such granting criteria can include, but are not limited to, the stocking number of designated users being reached prior to expiration of the stocking deadline. The value transfer may be initiated at the stocking deadline, or at any suitable date/time following the expiration of the stocking deadline, if the granting criteria are satisfied.

For example, if two million new subscriptions (registrations) are made to the service (e.g., the target stocking level) before six months has passed (e.g., the stocking date), then the top one million highest scoring designated users, ranked as of the stocking date, can be granted stock shares in the company that owns the service. As another example, the top one million top-ranked users as of one year after the stocking deadline may be granted the shares. In this way, implementations can provide multiple motivational deadlines to fuel the growth of the user base and user activity. Users that join after the stocking level is reached may not receive the shares. Accordingly, implementations can notify users of the number of users who have become designated users periodically, and/or in real time, and may indicate to each user whether they became a designated user before or after the stocking level was reached and/or before or after the stocking deadline. In some examples, if the stocking deadline expires before the stocking level is reached then no users may receive the shares grant.

In some examples, the platform may provide each user with an up-to-date, real time indication of their user score and whether they in the top number of users qualifying for a shares grant, or if their score is not high enough to currently qualify. In the latter case, indicating the current score can incentivize the user to try and engage in more scored activities prior to the date at which the rankings are used to determine who is to receive the shares grant. Although examples herein describe the grant of shares, other types of value may be transferred to users who qualify.

In the various implementations, the determination of the stocking level (stocking number), stocking deadline, number or percent of shares offered, value to the service of the (e.g., desirable) activities, points earned for the activities, the size of the pool of top-ranked users to be rewarded, and/or other parameters may be adjusted to achieve the desired incentive, and to enable a service to rapidly increase their user base and activity levels. Implementations can be applied to increase the user (e.g., customer) base and/or activity level of an online service (e.g., web site, e-commerce portal, social network, etc.). Implementations can also be applied to increase the user (e.g., customer) base and/or activity level of other types of services whose presence and/or activities are not primarily on the Internet, such as any type of brick-and-mortar retail services. Implementations can be applied to services (e.g., businesses) that are starting and looking to quickly ramp up their number of users and/or user activity. Implementations can also be applied to services that are more mature, and are looking to expand further. Through the application of the implementations described herein, users can gain an equity share in the service, which can benefit both the service and the users.

Figure 2:
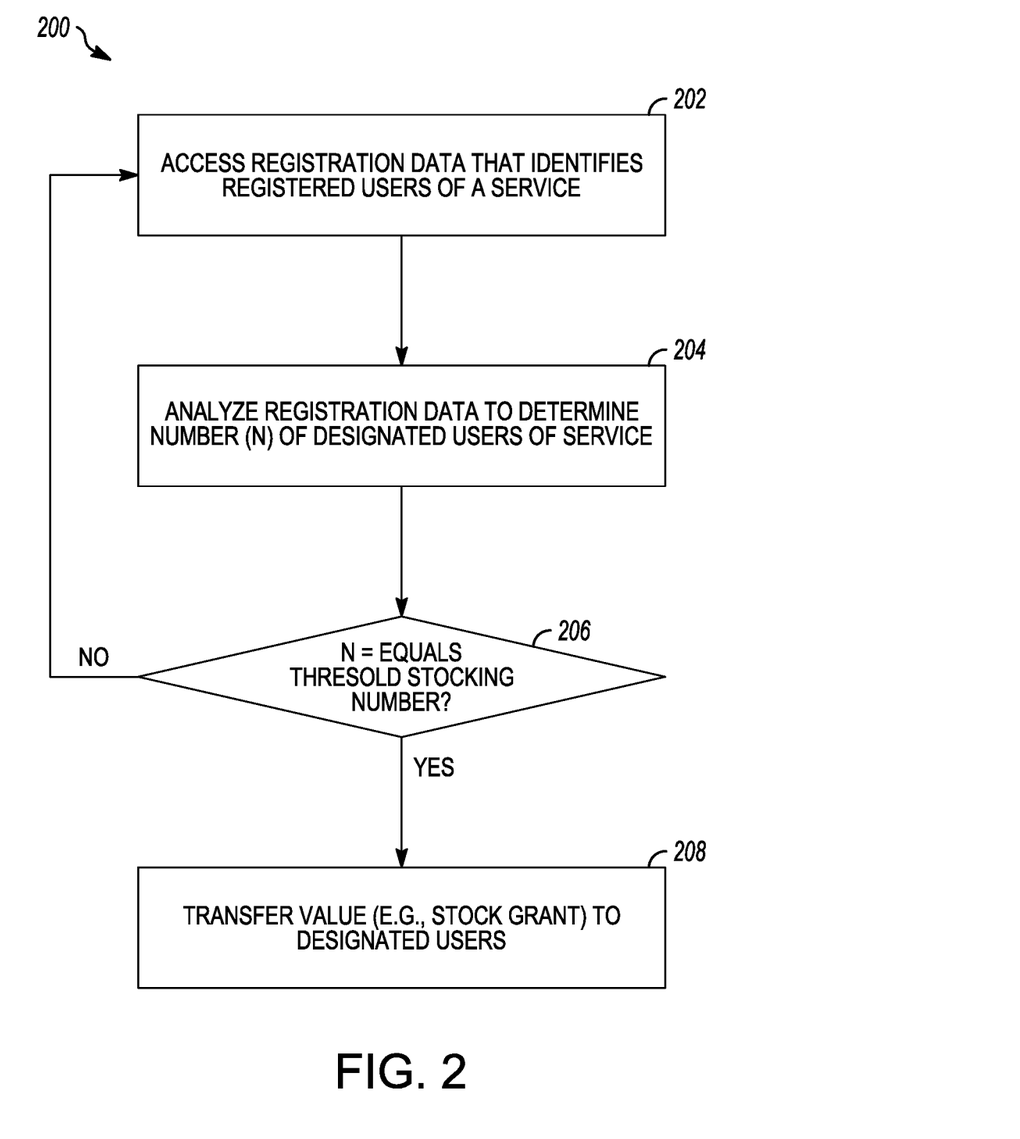
FIGS. 2-4 depict flow diagrams of example processes, according to implementations of the present disclosure.

FIG. 2 depicts a flow diagram 200 of an example process for managing the transfer of value to designated users, according to implementations of the present disclosure. Operations of the process can be performed by one or more of the designated user determination module(s) 114, the transfer management module(s) 112, the service 106, the UI(s) 110, and/or other software module(s) executing on the server device(s) 108 or elsewhere.

The registration data 118 can be accessed (202), the registration data 118 describing and/or identifying registered users of the service 106. As described above, registration can include checking to ensure that a new user satisfies requirements regarding minimum age, location, citizenship, and so forth, and may include filtering out bots, spamming processes, multiple registrations of the same user, potential fraudsters, and so forth.

The registration data 118 can be analyzed (204) to determine the current number N of designated users of the service 106. As described above, in some instances activity data 120 can also be employed to determine designated users based on their user scores.

A determination can be made (206) whether N is at least a target parameter (e.g., the threshold stocking number or stocking level).

If so, the value transfer (208) can be initiated to the designated users. If not, the process may continue monitoring for the target parameter to be reached. Initiating the transfer of value may include sending network communication(s) to initiate a transfer, to each designated user, of a value that includes at least one share in an entity that is associated with the service, such as an owner and/or operating company of the service.

Figure 3:
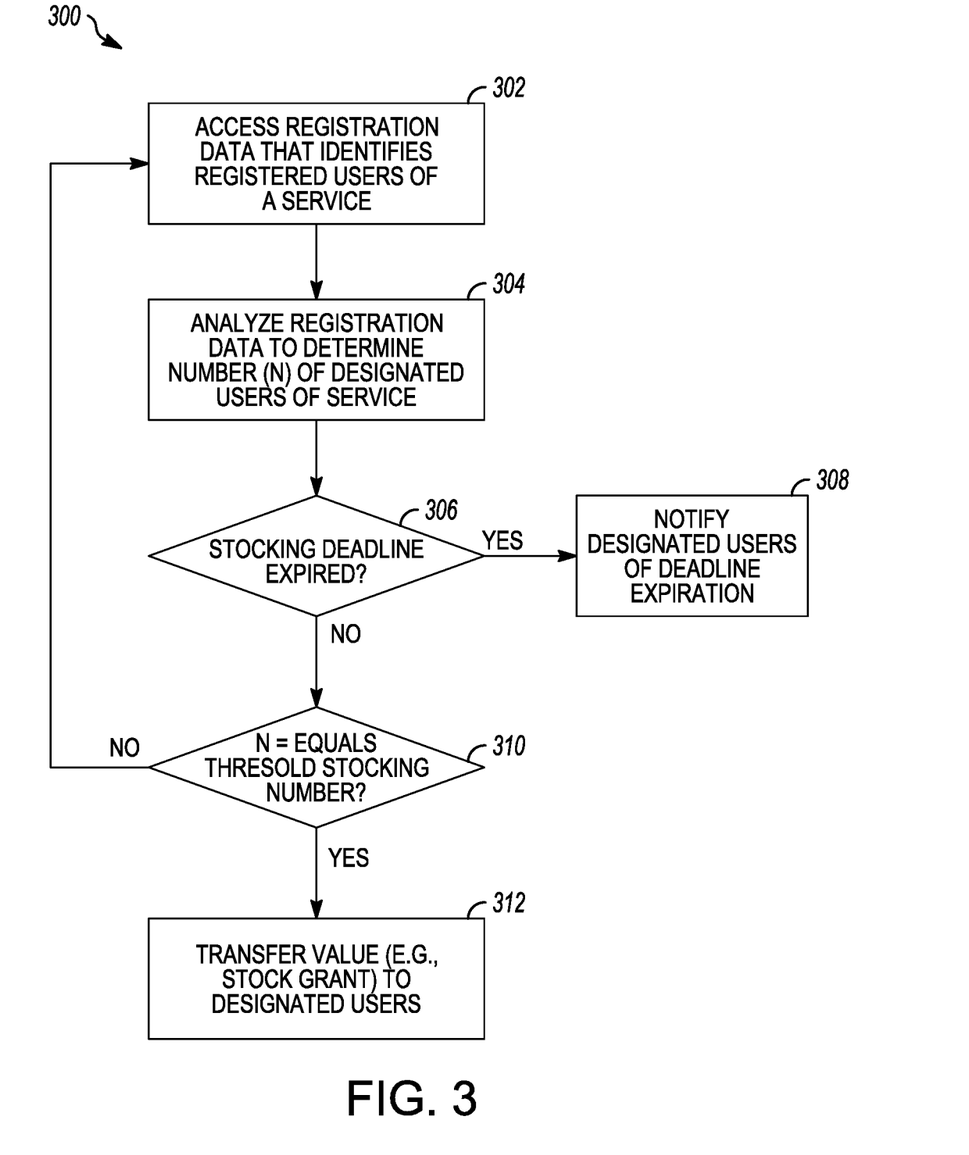

FIG. 3 depicts a flow diagram 300 of an example process for managing the transfer of value to designated users, according to implementations of the present disclosure. Operations of the process can be performed by one or more of the designated user determination module(s) 114, the transfer management module(s) 112, the service 106, the UI(s) 110, and/or other software module(s) executing on the server device(s) 108 or elsewhere.

The registration data 118 can be accessed (302), and analyzed (304) to determine the current number N of designated users of the service 106. As described above, in some instances activity data 120 can also be employed to determine designated users based on their user scores.

A determination can be made (306) whether the stocking deadline has expired. If so, designated users may be notified (308) of the deadline expiration, and/or that the value transfer may not occur. If the stocking deadline has not expired, a determination can be made (310) whether N is at least the target parameter (e.g., threshold stocking number or stocking level).

If so, the value transfer (312) can be initiated to the designated users. If not, the process may continue monitoring for the target parameter to be reached.

The processes of FIGS. 2 and/or 3 can be triggered periodically to check for the satisfaction of criteria that would trigger the value transfer. In some instances, the processes can be triggered by the registration of a new user.

Figure 4:
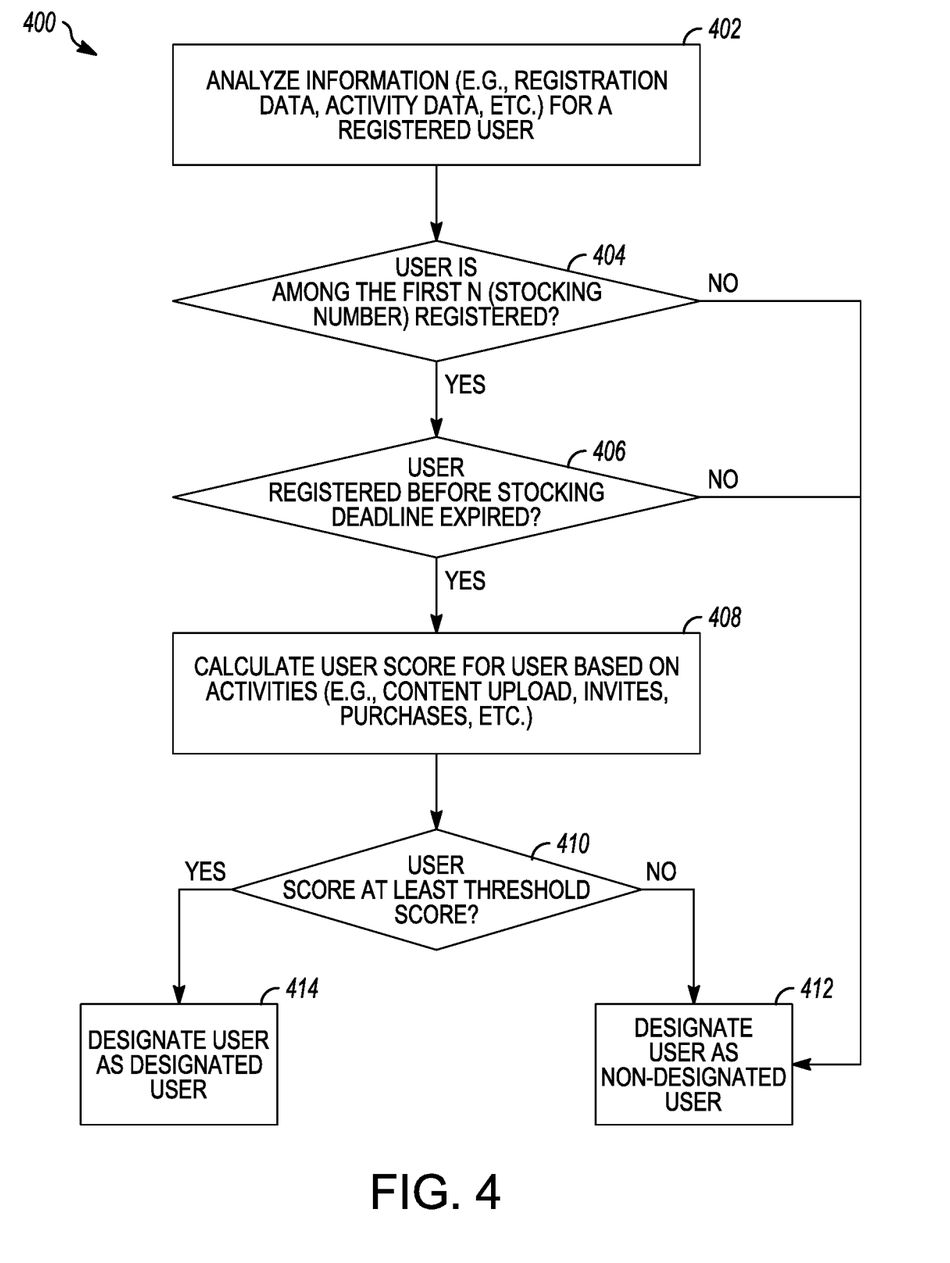

FIG. 4 depicts a flow diagram 400 of an example process for identifying designated users to receive a value transfer, according to implementations of the present disclosure. Operations of the process can be performed by one or more of the designated user determination module(s) 114, the transfer management module(s) 112, the service 106, the UI(s) 110, and/or other software module(s) executing on the server device(s) 108 or elsewhere.

Information for a particular registered user may be analyzed (402), including registration data 118 and/or activity data 120.

A determination may be made (404) whether the user is among the first N users (e.g., the target parameter) to be registered. If not, the user may be designated (412) as a non-designated user.

If so, a determination may be made (406) whether the user registered before the expiration of the stocking deadline. If not, the user may be designated (412) as a non-designated user.

If so, the user score for the user may be calculated (408) based on their activities, as described herein. A determination can be made (410) whether the user score is at least a threshold score. If not, the user may be designated (412) as a non-designated user. If so, the user may be designated (414) as a designated user.

Moreover, in some implementations, designated users may be designated as the top-ranked number of users (e.g., top million) according to their user scores. The criteria applied in this example, can be used individually or in any combination according to various implementations.

Figure 5:
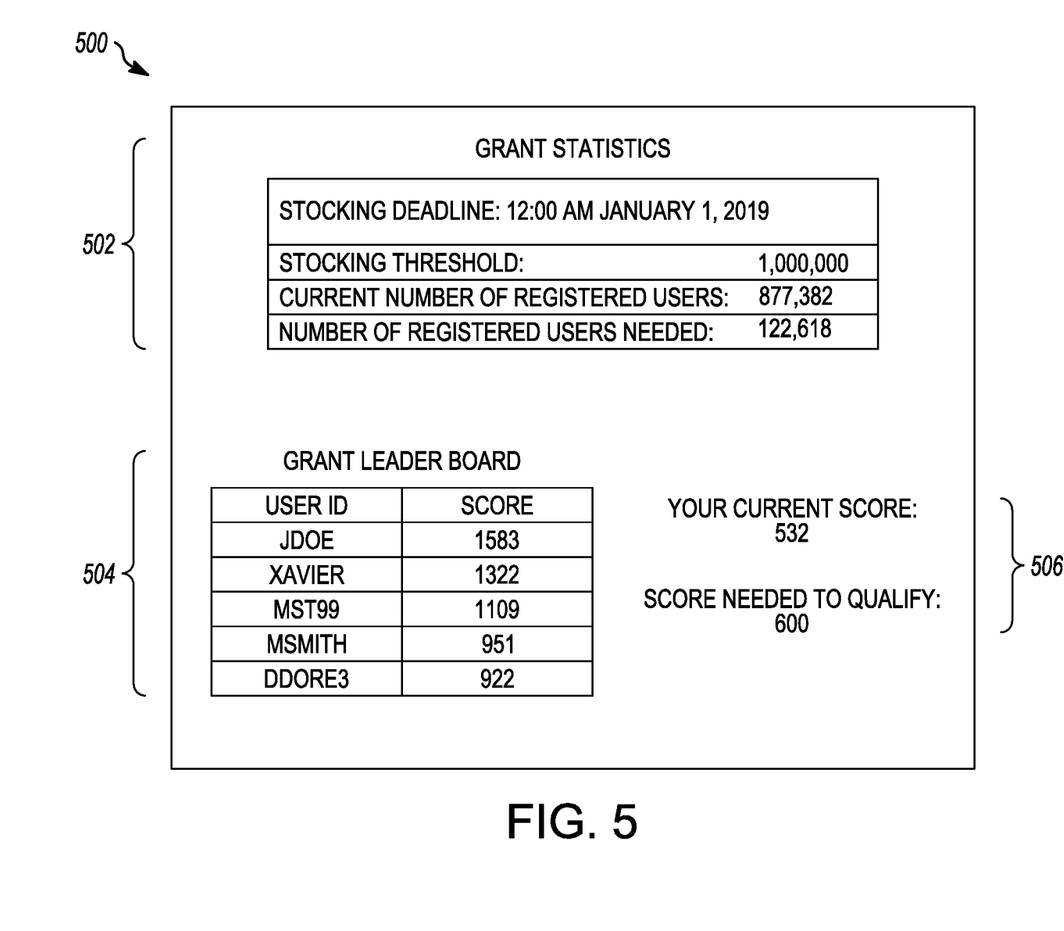
FIG. 5 depicts an example user interface, according to implementations of the present disclosure.

FIG. 5 depicts an example UI 500, according to implementations of the present disclosure. In some examples, the UI 500 may be presented as a part of the UI(s) 110 exposed by the service 106, as described above. Alternatively, the UI 500 may be presented separately and/or independently from the service UI(s) 110.

The UI 500 can include a section 502 that presents current grant statistics governing when and/or whether the value transfer may occur, such as the stocking deadline, the target parameter (threshold stocking number or stocking level) of designated users to be reached, a current number of designated users, and the number of designated users that are still needed to achieve the stocking threshold. The section 502 can also include other information such as the grant date (if different than the stocking deadline).

The UI 500 can include a section 504 that shows a current top-ranked number of users and/or their current scores (e.g., a leader board). A second 506 can present, to a currently logged on user of the service 106, their current score and the score they may need to achieve to be designated a designated user. In some examples, the current user's rank may be listed in the section 504 as well, to indicate how the user's score compares to that of other users.

In example embodiments, challenges associated with motivating different types of users or potential users of the service to act, to act more quickly, or to act more often (e.g., by registering for the service or performing scoring activities with respect to the service) are addressed. Users are classified into motivation types (e.g., based on any data described herein, such as data provided by the users to the service via one or more user interfaces, data pertaining to monitoring of behaviors of the users with respect to the service, or data collected or received from public databases or files that are accessed by the service). The motivation types include categories ranging from low-reward/high probability to high-reward/low probability. Thus, for example, a first motivation category or type may include users who are motivated by knowing that their time and effort will definitely result in some reward even if it is small. A second motivation category or type may include users who are motivated by knowing that if they get a reward it be huge even if the chance of receiving it is small. For the first type of users, a "Low Carrot Motivator" may be provided (e.g., within a Tiered Group) that offers a relatively low-ranking level at which at a small reward, such as a single share of stock in the service, is has a high likelihood of being transferred to the user. For the second type of users, a "Big Prize Motivator" may be provided, which could result a relatively large value (e.g., perhaps as much as 1% of the stock in the service) being transferred to a single user, but for which a transfer to the user has a relatively low likelihood of occurring. The Big Prize Motivator may be associated with a Top Group. In example embodiments, the Top Group may be limited to a small number of users (e.g., 10 out of a million). In example embodiments, the Top Group is associated with a prize to be set at a large, easy-to-understand, non-varying level, like 1%, which might make the marketing the entire boost period more effective. In example embodiments, having two reward groups allows for both the low and high motivator to be used. The Tiered Group may have a range of tiers to encourage activity, including a Do-More-Get-More Motivator to be used in which higher rankings lead to increased rewards.

In example embodiments, in addition to general motivators, the system may be configured to offer rewards for specific task motivations. For example, an "Early Bird" reward might start high and decline over a time period (e.g., each day). In this way, users will be incentivized to perform an act (e.g., register for the service) sooner. As another example, a "Dump Dominant" reward may offer a user that has an account with the dominant company in a category, such as the company with the largest market share, a point reward for closing their account with that dominant company so as to be loyal to the new company (e.g., the service) for which the user boost is being provided via the computer enhancements described herein.

In example embodiments, a validation motivation is applied. Companies make many claims, and customers are naturally skeptical of such claims, especially those offering significant prizes. Therefore, a user boost campaign is provided that is conducted in multiple phases that begin, end and give out rewards. In this way, users that receive rewards during an early phase one can validate the fact they received the reward (e.g., via social media). This validation will likely cause more people to join in future phases.

In example embodiments, the reward amounts and probabilities are configurable or adjustable (e.g., via an administrative user interface). Through the user interface, a user (e.g., an administrator) may be able to view (e.g., in a first panel or view of the user interface) the effectiveness of current reward amounts and probabilities with respect to encouraging desired actions by the users or achieving a desired result and user interface controls (e.g., in a second panel or view of the user interface) for adjusting the reward amounts and probabilities. In addition, the user interface may include one or more user interface controls for specifying or weighting input data for categorizing users into one or more motivation types or otherwise managing or adjusting the motivation categories into which users are placed.

In example embodiments, a registration process for the service may include various information required for the user to open a brokerage account (e.g., via a third party) into which to receive any transferred value of the service. In example embodiments, the information is stored and provided to the third party in order for a brokerage account be opened for the user upon a notification that the user will be receiving a transfer of value. The information collected may correspond to information required by various regulatory agencies for opening a brokerage account. In example embodiments, the user may opt out of having a new brokerage account created, instead providing the service with various information needed to link an existing brokerage account to the service for the purpose of receiving any transferred value.

As an example, consider a start-up company that operates an Internet service. In order to grow quickly, an administrator configures the system described herein to transfer a certain percentage (e.g., 30%) of the company's stock to users who satisfy the following criteria: (1) join (e.g., register) in the first 100,000 users, join within a boost period (e.g., within three months), and perform enough desirable activities to be in the top 50% of point earners (e.g., recruiting other users to the service). Furthermore, the administrator allocates 10% of the offered stock to the top 10 users (e.g., each of the top 10 users get 1%) and 20% to the top 99,990 users (e.g., according to a sliding scale corresponding to points earned). Then, based on access to continuous monitoring of real-time behavior of users with respect to the system, which is presented in one or more user interfaces, the administrator can set any of these parameters of the system for one or more boosts, which, in example embodiments, remain fixed through each of the one or more boosts. In example embodiments, boost may be defined or configured to have multiple phases. A first phase may allocate a first value for transferring to users who satisfy one or more criteria, a second phase may allocate a second value for transferring to users who satisfy the same criteria or one or more additional or different criteria, and so on. In this way, the administrator can increase the chances that the start-up company will achieve its desired rate of growth.

The implementations described herein provide technical advantages and/or technical improvements over previously used systems. The implementations described herein provide for more efficient use of processing capacity, storage space, network bandwidth, active memory, and/or other computing resources, compared to previously used systems. In some implementations, the determination of whether a user is a designated user to receive value (e.g., shares) can be performed dynamically, in real time with respect to the generation and analysis of the registration data and/or activity data as described herein. Moreover, the value transfer to designated user(s) may be performed dynamically, in real time with respect to the determination that the one or more criteria have been satisfied to initiate the value transfer. As used herein, a real time operation may be performed in response to a triggering event, or in response to a triggering condition, without any intervening human activity being required. The real time operation may be performed in response to the triggering event, or in response to the detection of a triggering condition, within a short period of time (e.g., immediately), taking into account any latency in computer processing, network communications, data storage access, and/or other (e.g., unavoidable) delays that are inherent in the computing system performing the operations. Accordingly, a real time operation may be described as a synchronous operation with respect to the triggering event or triggering condition. In some examples, a real time operation may be performed in a same execution path as the detection of the triggering event or triggering condition. In some implementations, the value transfer is performed as a network communication (e.g., signal) that initiates the transfer to an account of each of the designated users. In some implementations, the value transfer includes sending a signal to a printing device and/or automatic mail system to print out a document indicating the value transfer and/or package that document in an envelope to be mailed to the designated user. The display of information through the UI(s) as described herein may be performed (e.g., in real time) with respect to the calculations performed to identify designated users and/or to determine whether criteria for initiating the value transfer have been satisfied. Accordingly, implementations described herein improve on previously available user interfaces and increase the operational efficiency of the computing devices described herein, by providing current, up-to-date information regarding the stocking threshold, the number of registered users, the number of registered users still needed to meet the stocking threshold, user scores, user rankings, and/or other information that is associated with the management of the value transfer described herein.

Figure 6:
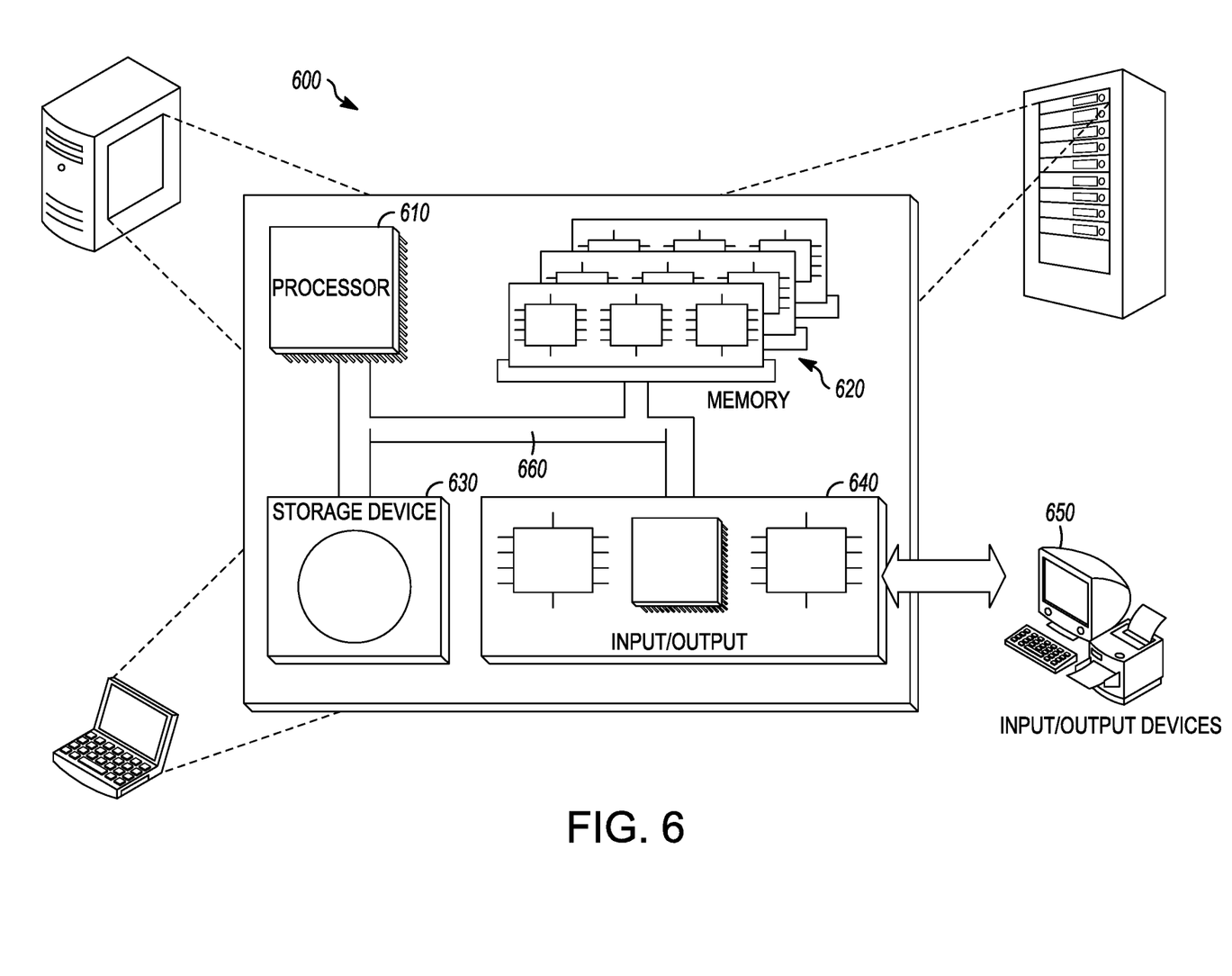
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the user device(s) 104, the server device(s) 108, and/or other computing device(s) or system(s) described herein. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 may execute instructions for the various software module(s) described herein. The processor(s) 610 may include hardware-based processor(s) each including one or more cores. The processor(s) 610 may include general purpose processor(s), special purpose processor(s), or both. In some examples, the computing systems described herein can be quantum computers.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, solid state device, an optical disk device, or a tape device. The storage device(s) 630 may include read-only memory, random access memory, or both. The storage device(s) 630 may include one or more of an internal hard drive, an external hard drive, or a removable drive. In some examples, the storage is distributed across multiple storage devices. For example a distributed ledger system and/or distributed ledger network of one or more blockchains can be employed to store information.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, application, app, script, and/or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, or an intelligent personal digital assistant device (e.g., an Amazon Alexa, Google Assistant, or Siri device), to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the scope of the disclosure. For example, various forms of the flows shown above may be used, with steps re-ordered, added, or removed. Accordingly, other implementations are within the scope of the following claims.

The invention claimed is:

1. A system comprising:
one or more computer processors;
one or more computer memories; and
a set of computer instructions stored into the one or more computer memories, the set of computer instructions configuring the one or more computer processors to perform operations for increasing a growth of a plurality of users of a service or for increasing use of the service by the plurality of users, the operations comprising:
dynamically calculating user-specific information for each user of a plurality of users, the user-specific information including a score associated with the user, the score representing combined values of points associated with each scoring activity of a set of scoring activities performed by the user with respect to the service, each of the values of the points associated with each scoring activity of the set of scoring activities being parameters of the service that are configurable, the user-specific information further including a first motivation tier group of one or more motivation tier groups to which the user belongs, the first motivation tier group associated with a first value transfer, any additional tier groups of the one or more motivation tier groups associated with additional value transfers, each additional value transfer of the any additional value transfers being different than the first value transfer, the one or more motivation tier groups to which the user belongs determined based on real-time monitoring of behavior of the user with respect to the service;
offering the first value transfer to users of the plurality of users that belong to the first motivation tier group and offering the any additional value transfers to users of the plurality of users that belong to the any additional motivation tier groups;
identifying one or more designated users from the plurality of users based on a determination that one or more qualifying criteria have been satisfied, the one or more qualifying criteria including that each designated user has a ranking that transgresses a threshold ranking, the ranking being based on the scores, the threshold ranking being an additional parameter of the service that is configurable; and
initiating the first value transfer or the any additional value transfers to each designated user of the one or more designated users based on the motivation tier group of the plurality of tier groups to which the designated user belongs and based on a determination that one or more granting criteria have been satisfied, the granting criteria including that a number of the one or more identified designated users has been reached prior to expiration of a deadline, the number and the deadline being further parameters of the service that are configurable.

2. The system of claim 1, wherein the points associated with a first activity of the set of scoring activities are greater than the points associated with a second activity of the set of scoring activities based on an assessment the first activity in comparison to an assessment of the second activity to the service.

3. The system of claim 2, wherein the first activity includes a referral activity that results in an increase in a number of designated users and the second activity is a referral activity that results in an increase in a number of registered users.

4. The system of claim 2, the operations further comprising incentivizing the plurality of users to engage in the set of scoring activities by communicating one or more notifications to the plurality of users, the one or more notifications including information pertaining to the points associated with the first activity, the points associated with the second activity, and a score for attaining the ranking.

5. A method comprising:
storing a set of instructions into one or more computer memories of a computer system, the set of instructions configuring one or more computer processors of the computer system to perform operations for increasing a growth of a plurality of users of a service or for increasing use of the service by the plurality of users, the operations comprising:
dynamically calculating user-specific information for each user of a plurality of users, the user-specific information including a score associated with the user, the score representing combined values of points associated with each scoring activity of a set of scoring activities performed by user with respect to the service, each of the values of the points associated with each scoring activity of the set of scoring activities being parameters of the service that are configurable, the user-specific information further including a first motivation tier group of one or more motivation tier groups to which the user belongs, the first motivation tier group associated with a first value transfer, any additional tier groups of the one or more motivation tier groups associated with additional value transfers, each additional value transfer of the any additional value transfers being different than the first value transfer, the one or more motivation tier groups to which the user belongs determined based on real-time monitoring of behavior of the user with respect to the service;
offering the first value transfer to users of the plurality of users that belong to the first motivation tier group and offering the any additional value transfers to users of the plurality of users that belong to the any additional motivation tier groups;
identifying one or more designated users from the plurality of users based on a determination that one or more qualifying criteria have been satisfied, the one or more qualifying criteria including that each designated user has a ranking that transgresses a threshold ranking, the ranking being based on the scores, the threshold ranking being an additional parameter of the service that is configurable; and
initiating the first value transfer or the any additional value transfers to each designated user of the one or more designated users based on the motivation tier group of the plurality of tier groups to which the designated user belongs and based on a determination that one or more granting criteria have been satisfied, the granting criteria including that a number of the one or more identified designated users has been reached prior to expiration of a deadline, the number and the deadline being further parameters of the service that are configurable.

6. The method of claim 5, wherein the points associated with a first activity of the set of scoring activities are greater than the points associated with a second activity of the set of scoring activities based on a determined value of the first activity to the service being greater than a determined value of the second activity to the service.

7. The method of claim 6, wherein the first activity includes a referral activity that results in an increase in a number of designated users and the second activity is a referral activity that results in an increase in a number of registered users.

8. The method of claim 6, the operations further comprising incentivizing the plurality of users to engage in the set of scoring activities by communicating one or more notifications to the plurality of users, the one or more notifications including information pertaining to the points associated with the first activity, the points associated with the second activity, and a score for attaining the ranking.

9. A non-transitory computer-readable storage medium storing a set of instructions that, when executed by one or more computer processors, cause the one or more computer processors to perform operations for increasing a growth of a plurality of users of a service Rama or for increasing use of the service by the plurality of users, the operations comprising:
dynamically calculating user-specific information for each user of a plurality of users, the user-specific information including a score associated with the user, the score representing combined values of points associated with each scoring activity of a set of scoring activities performed by the user with respect to the service, each of the values of the points associated with each scoring activity of the set of scoring activities being parameters of the service that are configurable, the user-specific information further including a first motivation tier group of one or more motivation tier groups to which the user belongs, the first motivation tier group associated with a first value transfer, any additional tier groups of the one or more motivation tier groups associated with additional value transfers, each additional value transfer of the any additional value transfers being different than the first value transfer, the one or more motivation tier groups to which the user belongs determined based on real-time monitoring of behavior of the user with respect to the service;
offering the first value transfer to users of the plurality of users that belong to the first motivation tier group and offering the any additional value transfers to users of the plurality of users that belong to the any additional motivation tier groups;
identifying one or more designated users from the plurality of users based on a determination that one or more qualifying criteria have been satisfied, the one or more qualifying criteria including that each designated user has a ranking that transgresses a threshold ranking, the ranking being based on the scores, the threshold ranking being an additional parameter of the service that is configurable; and
initiating the first value transfer or the any additional value transfers to each designated user of the one or more identified designated users based on the motivation tier group of the plurality of tier groups to which the designated user belongs and based on a determination that one or more granting criteria have been satisfied, the granting criteria including that a number of the one or more identified designated users has been reached prior to expiration of a deadline, the number and the deadline being further parameters of the service that are configurable.

10. The computer-readable storage medium of claim 9, wherein the points associated with a first activity of the set of scoring activities are greater than the points associated with a second activity of the set of scoring activities based on a determined value of the first activity to the service being greater than a determined value of the second activity to the service.

11. The computer-readable storage medium of claim 10, wherein the first activity includes a referral activity that results in an increase in a number of designated users and the second activity is a referral activity that results in an increase in a number of registered users.

12. The computer-readable storage medium of claim 10, the operations further comprising incentivizing the plurality of users to engage in the set of scoring activities by communicating one or more notifications to the plurality of users, the one or more notifications including information pertaining to the points associated with the first activity, the points associated with the second activity, and a score for attaining the ranking.

13. A method comprising:
storing a set of instructions into one or more computer memories of a computer system, the set of instructions configuring one or more computer processors of the computer system to perform operations for increasing a growth of a set of users of a service or for increasing activity levels of the set of users with respect to the service, the operations comprising:
communicating a notification of a value that is to be transferred to one or more designated users of the set of users based on a determination that one or more qualifying criteria has been satisfied and one or more granting criteria has been satisfied, the one or more qualifying criteria including that each designated user of the one or more designated users achieves a score with respect to the service that transgresses a threshold score, the one or more granting criteria including that a number of the one or more designated users has been reached before an expiration of a deadline, wherein the threshold score, the number, the deadline, and each scoring activity of the set of scoring activities are parameters of the service that are configurable, the value based on a first motivation tier group of one or more motivation tier groups to which the one or more designated users belong, the one or more motivation tier groups to which the one or more designated users belong determined based on real-time monitoring of behavior of the one or more designated users with respect to the service; and
based on the determination that the one or more qualifying criteria has been satisfied and the one or more granting criteria has been satisfied, initiating the transferring of the value to the designated users of the set of users.

14. The method of claim 13, wherein the one or more qualifying criteria further include that each designated user of the one or more designated users joins the service before an end of a first phase of a period.

15. The method of claim 13, wherein the one or more qualifying criteria further include that each user of the one or more designated users achieves the score before an end of a first phase of a period.

16. The method of claim 13, wherein the one or more qualifying criteria further includes that each user of the one or more designated users achieves a ranking that is equal to or greater than a threshold ranking, wherein the threshold ranking is an additional parameter of the service that is configurable to increase the growth of the service.

17. A method comprising:
storing a set of instructions into one or more computer memories of a computer system, the set of instructions configuring one or more computer processors of the computer system to perform operations for increasing a growth and usage of a service, the operations comprising:
communicating a notification of a value that is to be transferred to a user of a plurality of users of the service based on a determination that one or more criteria have been satisfied before expiration of a deadline, the one or more criteria including that a number of the plurality of users register with the service before the expiration of the deadline, wherein the number of the users and the deadline are parameters of the service that are configurable, the value based on a first motivation tier group of one or more motivation tier groups to which the user belongs, the one or more motivation tier groups to which the user belongs determined based on real-time monitoring of behavior of the user with respect to the service; and
based on the determination that the one or more criteria have been satisfied before expiration of the deadline, initiating the transferring of the value to the user.

18. The method of claim 17, wherein the one or more criteria further include that the users become designated users before the expiration of the deadline.

19. The method of claim 17, wherein the one or more criteria further include that the users achieve scores that are equal to or greater than a threshold score before the expiration of the deadline.

20. The method of claim 17, wherein the one or more criteria further include that the users achieve a ranking that is equal to or greater than a threshold ranking before the expiration of the deadline.

21. The method of claim 17, the operations further comprising:
communicating a notification of an additional value that is to be transferred to additional users that satisfy one or more additional criteria, the one or more additional criteria including that an additional number of the users register with the service before an expiration of an additional deadline, wherein the additional number of the users and the additional deadline are additional parameters of the service that are configurable based on real-time monitoring of behavior of the users; and
based on a determination that the one or more additional criteria have been met, initiating the transferring of the additional value the additional users that satisfy the one or more additional criteria.

22. The system of claim 1, wherein the dynamically calculating user-specific information for each of a plurality of users is performed at least in part while each of the plurality of users is accessing the service.

* * * * *

UNITED STATES PATENT AND TRADEMARK OFFICE
CERTIFICATE OF CORRECTION

| | | |
|---|---|---|
| PATENT NO. | : 11,978,002 B2 | Page 1 of 1 |
| APPLICATION NO. | : 16/673698 | |
| DATED | : May 7, 2024 | |
| INVENTOR(S) | : Douglas Logan Darrow Clements | |

It is certified that error appears in the above-identified patent and that said Letters Patent is hereby corrected as shown below:

In the Claims

In Column 19, Line 26, in Claim 5, after "by", insert --the--

In Column 20, Line 21, in Claim 9, after "service", delete "Rama"

Signed and Sealed this
Thirty-first Day of December, 2024

Derrick Brent
*Acting Director of the United States Patent and Trademark Office*